United States Patent
Broussard et al.

(10) Patent No.: US 9,410,410 B2
(45) Date of Patent: Aug. 9, 2016

(54) SYSTEM FOR PUMPING HYDRAULIC FRACTURING FLUID USING ELECTRIC PUMPS

(71) Applicant: US Well Services LLC, Houston, TX (US)

(72) Inventors: Joel N. Broussard, Lafayette, LA (US); Jeff McPherson, Spring, TX (US); Robert Kurtz, Fairmont, WV (US)

(73) Assignee: US Well Services LLC, Houston, TX (US)

( * ) Notice: Subject to any disclaimer, the term of this patent is extended or adjusted under 35 U.S.C. 154(b) by 229 days.

(21) Appl. No.: 13/679,689

(22) Filed: Nov. 16, 2012

(65) Prior Publication Data

US 2014/0138079 A1 May 22, 2014

(51) Int. Cl.
*E21B 43/26* (2006.01)

(52) U.S. Cl.
CPC ..................................... *E21B 43/26* (2013.01)

(58) Field of Classification Search
CPC ..................................................... E21B 43/26
USPC ........................................... 166/308.1, 177.5
See application file for complete search history.

(56) References Cited

U.S. PATENT DOCUMENTS

| | | | | |
|---|---|---|---|---|
| 2,248,051 A * | 7/1941 | Armstrong | ..................... | 405/208 |
| 3,722,595 A * | 3/1973 | Kiel | ........................... | 166/308.4 |
| 5,865,247 A * | 2/1999 | Paterson et al. | ............ | 166/252.1 |
| 6,271,637 B1 * | 8/2001 | Kushion | ......................... | 318/434 |
| 6,529,135 B1 * | 3/2003 | Bowers et al. | ................ | 340/648 |
| 6,931,310 B2 * | 8/2005 | Shimizu et al. | .............. | 701/33.7 |
| 7,312,593 B1 * | 12/2007 | Streicher et al. | .............. | 318/473 |
| 7,755,310 B2 * | 7/2010 | West et al. | ............... | 318/400.02 |
| 7,845,413 B2 * | 12/2010 | Shampine et al. | ............ | 166/369 |
| 8,054,084 B2 * | 11/2011 | Schulz et al. | ................. | 324/545 |
| 8,310,272 B2 * | 11/2012 | Quarto | ..................... | 324/765.01 |
| 8,354,817 B2 * | 1/2013 | Yeh et al. | ....................... | 318/812 |
| 8,789,601 B2 * | 7/2014 | Broussard | ............... | E21B 43/26 166/177.5 |
| 8,838,341 B2 * | 9/2014 | Kumano | ......................... | 701/42 |
| 9,018,881 B2 * | 4/2015 | Mao et al. | ...................... | 318/490 |
| 2007/0201305 A1 * | 8/2007 | Heilman et al. | ............... | 366/141 |
| 2010/0132949 A1 * | 6/2010 | DeFosse et al. | ............ | 166/308.1 |
| 2011/0272158 A1 * | 11/2011 | Neal | ........................... | 166/305.1 |
| 2012/0085541 A1 * | 4/2012 | Love et al. | ................. | 166/308.1 |
| 2012/0205301 A1 * | 8/2012 | McGuire et al. | .............. | 210/151 |
| 2012/0255734 A1 | 10/2012 | Coli et al. | | |
| 2013/0306322 A1 * | 11/2013 | Sanborn | .................. | E21B 43/26 166/308.1 |
| 2014/0010671 A1 | 1/2014 | Cryer et al. | | |
| 2014/0251623 A1 * | 9/2014 | Lestz et al. | ................. | 166/308.2 |

* cited by examiner

*Primary Examiner* — Kenneth L Thompson
(74) *Attorney, Agent, or Firm* — Bracewell LLP; Taylor P. Evans

(57) ABSTRACT

A system for hydraulically fracturing an underground formation in an oil or gas well to extract oil or gas from the formation, the oil or gas well having a wellbore that permits passage of fluid from the wellbore into the formation. The system includes a plurality of electric pumps fluidly connected to the well, and configured to pump fluid into the wellbore at high pressure so that the fluid passes from the wellbore into the and fractures the formation. The system can also include a plurality of natural gas powered generators electrically connected to the plurality of electric pumps to provide electrical power to the pumps.

21 Claims, 2 Drawing Sheets

SYSTEM FOR PUMPING HYDRAULIC FRACTURING FLUID USING ELECTRIC PUMPS

BACKGROUND OF THE INVENTION

1. Field of the Invention

This technology relates to hydraulic fracturing in oil and gas wells. In particular, this technology relates to pumping fracturing fluid into an oil or gas well using pumps powered by electric motors.

2. Brief Description of Related Art

Hydraulic fracturing has been used for decades to stimulate production from conventional oil and gas wells. The practice consists of pumping fluid into a wellbore at high pressure. Inside the wellbore, the fluid is forced into the formation being produced. When the fluid enters the formation, it fractures, or creates fissures, in the formation. Water, as well as other fluids, and some solid proppants, are then pumped into the fissures to stimulate the release of oil and gas from the formation.

Fracturing rock in a formation requires that the fracture fluid be pumped into the wellbore at very high pressure. This pumping is typically performed by large diesel-powered pumps. Such pumps are able to pump fracturing fluid into a wellbore at a high enough pressure to crack the formation, but they also have drawbacks. For example, the diesel pumps are very heavy, and thus must be moved on heavy duty trailers, making transport of the pumps between oilfield sites expensive and inefficient. In addition, the diesel engines required to drive the pumps require a relatively high level of expensive maintenance. Furthermore, the cost of diesel fuel is much higher than in the past, meaning that the cost of running the pumps has increased.

What is needed therefore, is a pump system for hydraulic fracturing fluid that overcomes the problems associated with diesel pumps.

SUMMARY OF THE INVENTION

Disclosed herein is a system for hydraulically fracturing an underground formation in an oil or gas well to extract oil or gas from the formation, the oil or gas well having a wellbore that permits passage of fluid from the wellbore into the formation. The system includes a plurality of electric pumps fluidly connected to the well, and configured to pump fluid into the wellbore at high pressure so that the fluid passes from the wellbore into the formation, and fractures the formation. The system also includes a plurality of generators electrically connected to the plurality of electric pumps to provide electrical power to the pumps. At least some of the plurality of generators can be powered by natural gas, in addition, at least some of the plurality of generators can be turbine generators.

In one embodiment, the system further includes an A/C console and a variable frequency drive that controls the speed of the pumps. Furthermore, the electric pumps, as well as the electric generators, can be mounted on vehicles, and can be ported from one well to another. The vehicles can be trucks and can have at least five axles.

Further disclosed herein is a system for fracturing a rock formation in an oil or gas well by pumping hydraulic fracturing fluid into the well that includes a pump, an electric motor, a variable frequency drive, and a natural gas powered electric generator. The pump is configured for pumping the hydraulic fracturing fluid into the well, and then from the well into the formation, and is capable of pumping the hydraulic fracturing fluid at high pressure to crack the formation. The electric motor can have a high-strength steel or steel alloy shaft attached to the pump and configured to drive the pump. The variable frequency drive can be connected to the electric motor to control the speed of the motor. In addition, the natural gas powered generator, which can be a turbine generator, can be connected to the electric motor and provide electric power to the electric motor.

In one embodiment, the pump can be a triplex or a quinteplex pump, optionally rated at about 2250 hydraulic horsepower or more. In addition, the pump can also have 4.5 inch diameter plungers with an eight inch stroke. In another embodiment, the electric motor can have a maximum continuous power output of about 1500 brake horsepower, 1750 brake horsepower, or more, and a maximum continuous torque of about 8750 lb-ft or more. Furthermore, the electric motor can have a high temperature rating of about 1100 degrees C. or more, and a shaft composed of 4340 alloy steel.

In another embodiment, variable frequency drive can frequently perform electric motor diagnostics to prevent damage to the electric motor if it becomes grounded or shorted. In addition, the variable frequency drive can include power semiconductor heat sinks having one or more thermal sensors monitored by a microprocessor to prevent semiconductor damage caused by excessive heat.

Also disclosed herein is a system for hydraulically fracturing an underground formation in an oil or gas well to extract oil or gas from the formation, the oil or gas well having a wellbore that permits passage of fluid from the wellbore into the formation. The system includes a trailer for attachment to a truck. Two or more electric pumps can be attached to the trailer and are fluidly connected to the well, the electric pumps configured to pump fluid into the wellbore at high pressure so that the fluid passes from the wellbore into the formation, and fractures the formation. One or more electric motors are attached to the electric pumps to drive the pumps. The electric motors can also be attached to the trailer. A natural gas powered generator is provided for connection to the electric motor to provide electric power to the electric motor. The system of claim can further include a variable frequency drive attached to the trailer and connected to the electric motor to control the speed of the motor. In addition, the system can include a skid to which at least one of the electric pumps, the one or more electric motors, and the variable frequency drives are attached.

Also disclosed herein is a process for stimulating an oil or gas well by hydraulically fracturing a formation in the well. The process includes the steps of pumping fracturing fluid into the well with an electrically powered pump at a high pressure so that the fracturing fluid enters and cracks the formation, the fracturing fluid having at least a liquid component and a solid proppant, and inserting the solid proppant into the cracks to maintain the cracks open, thereby allowing passage of oil and gas through the cracks. The process can further include powering the electrically powered pump with a natural gas generator, such as, for example, a turbine generator.

BRIEF DESCRIPTION OF THE DRAWINGS

The present technology will be better understood on reading the following detailed description of nonlimiting embodiments thereof, and on examining the accompanying drawing, in which.

DETAILED DESCRIPTION OF THE PREFERRED EMBODIMENT

Figure 1:
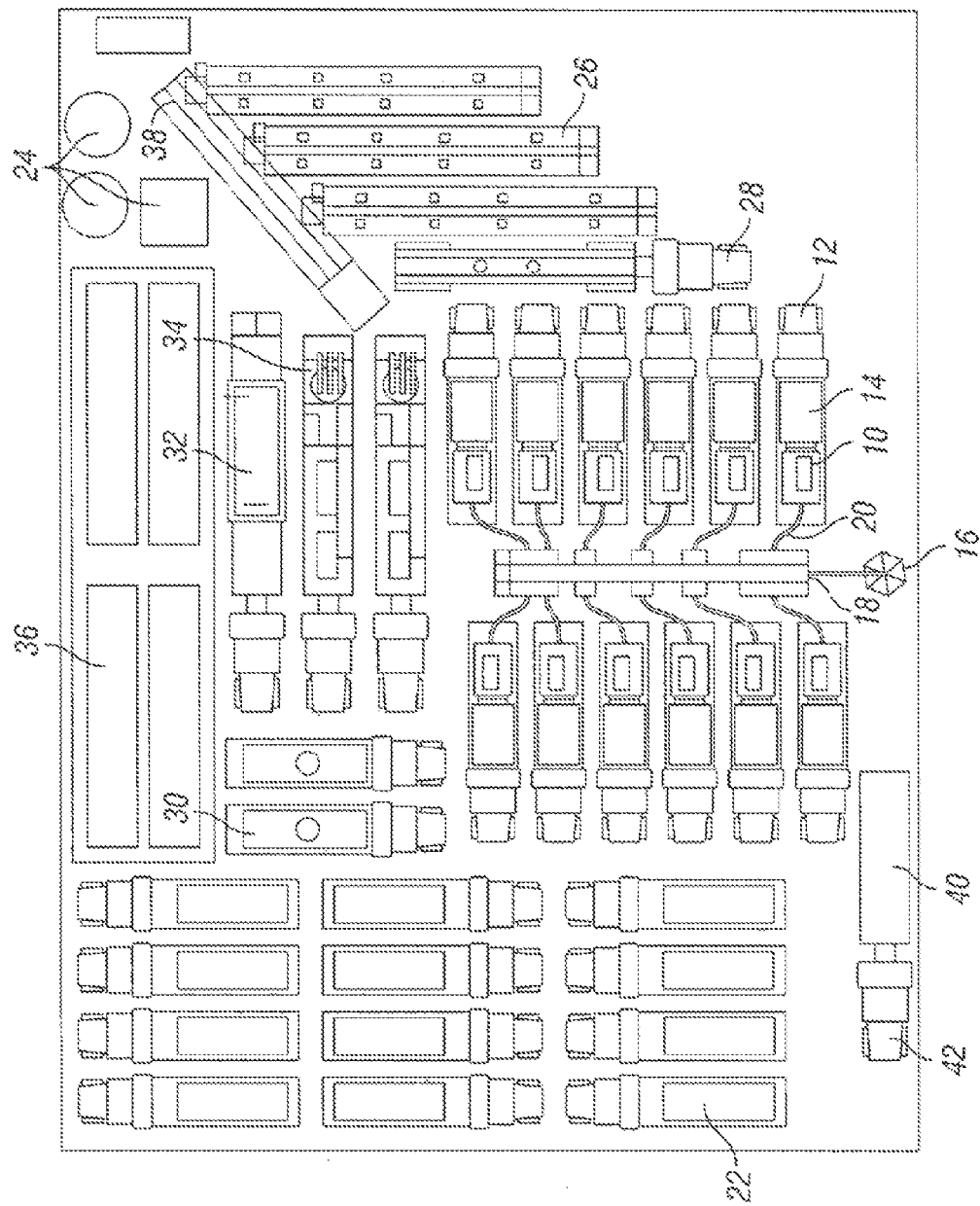
FIG. 1 is a schematic plan view of equipment used in a hydraulic fracturing operation, according to an embodiment of the present technology.

The foregoing aspects, features, and advantages of the present technology will be further appreciated when considered with reference to the following description of preferred embodiments and accompanying drawing, wherein like reference numerals represent like elements. In describing the preferred embodiments of the technology illustrated in the appended drawing, specific terminology will be used for the sake of clarity. However, the technology is not intended to be limited to the specific terms used, and it is to be understood that each specific term includes equivalents that operate in a similar manner to accomplish a similar purpose.

FIG. 1 shows a plan view of equipment used in a hydraulic fracturing operation. Specifically, there is shown a plurality of pumps 10 mounted to pump vehicles 12. The pump vehicles 12 can be trucks having at least five axles. In the embodiment shown, the pumps 10 are powered by electric motors 14, which can also be mounted to the pump vehicles 12. The pumps 10 are fluidly connected to the wellhead 16 via the missile 18. As shown, the pump vehicles 12 can be positioned near enough to the missile 18 to connect fracturing fluid lines 20 between the pumps 10 and the missile 18. The missile 18 is then connected to the wellhead 16 and configured to deliver fracturing fluid provided by the pumps 10 to the wellhead 16.

In some embodiments, each electric motor 14 can be capable of delivering about 1500 brake horsepower (BHP), 1750 BHP, or more, and each pump 10 can optionally be rated for about 2250 hydraulic horsepower (HHP) or more. In addition, the components of the system, including the pumps 10 and the electric motors 14, can be capable of operating during prolonged pumping operations, and in temperature in a range of about 0 degrees C. or less to about 55 degrees C. or more. In addition, each electric motor 14 can be equipped with a variable frequency drive (VFD), and an A/C console, that controls the speed of the electric motor 14, and hence the speed of the pump 10.

The electric motors 14 of the present technology can be designed to withstand an oilfield environment. Specifically, some pumps 10 can have a maximum continuous power output of about 1500 BHP, 1750 BHP, or more, and a maximum continuous torque of about 8750 lb-ft or more. Furthermore, electric motors 14 of the present technology can include class H insulation and high temperature ratings, such as about 1100 degrees C. or more. In some embodiments, the electric motor 14 can include a single shaft extension and huh for high tension radial loads, and a high strength 4340 alloy steel shaft, although other suitable materials can also be used.

The VFD can be designed to maximize the flexibility, robustness, serviceability, and reliability required by oilfield applications, such as hydraulic fracturing. For example, as far as hardware is concerned, the VFD can include packaging receiving a high rating by the National Electrical Manufacturers Association (such as nema 1 packaging), and power semiconductor heat sinks having one or more thermal sensors monitored by a microprocessor to prevent semiconductor damage caused by excessive heat. Furthermore, with respect to control capabilities, the VFD can provide complete monitoring and protection of drive internal operations while communicating with an operator via one or more user interfaces. For example, motor diagnostics can be performed frequently (e.g., on the application of power, or with each start), to prevent damage to a grounded or shorted electric motor 14. The electric motor diagnostics can be disabled, if desired, when using, for example, a low impedance or high-speed electric motor.

In some embodiments, the pump 10 can optionally be a 2250 HHP triplex or quinteplex pump. The pump 10 can optionally be equipped with 4.5 inch diameter plungers that have an eight (8) inch stroke, although other size plungers can be used, depending on the preference of the operator. The pump 10 can further include additional features to increase its capacity, durability, and robustness, including, for example, 6.353 to 1 gear reduction, autuofrettaged steel or steel alloy fluid end, wing guided slush type valves, and rubber spring loaded packing.

In addition to the above, certain embodiments of the present technology can include a skid (not shown) for supporting some or all of the above-described equipment. For example, the skid can support the electric motor 14 and the pump 10. In addition, the skid can support the VFD. Structurally, the skid can be constructed of heavy-duty longitudinal beams and cross-members made of an appropriate material, such as, for example, steel. The skid can further include heavy-duty lifting lugs, or eyes, that can optionally be of sufficient strength to allow the skid to be lifted at a single lift point.

Referring back to FIG. 1, also included in the equipment is a plurality of electric generators 22 that are connected to, and provide power to, the electric motors 14 on the pump vehicles 12. To accomplish this, the electric generators 22 can be connected to the electric motors 14 by power lines (not shown). The electric generators 22 can be connected to the electric motors 14 via power distribution panels (not shown). In certain embodiments, the electric generators 22 can be powered by natural gas. For example, the generators can be powered by liquefied natural gas. The liquefied natural gas can be converted into a gaseous form in a vaporizer prior to use in the generators. The use of natural gas to power the electric generators 22 can be advantageous because, where the well is a natural gas well, above ground natural gas vessels 24 can already be placed on site to collect natural gas produced from the well. Thus, a portion of this natural gas can be used to power the electric generators 22, thereby reducing or eliminating the need to import fuel from offsite. If desired by an operator, the electric generators 22 can optionally be natural gas turbine generators, such as those shown in FIG. 2.

FIG. 1 also shows equipment for transporting and combining the components of the hydraulic fracturing fluid used in the system of the present technology. In many wells, the fracturing fluid contains a mixture of water, sand or other proppant, acid, and other chemicals. Examples of fracturing fluid components include acid, anti-bacterial agents, clay stabilizers, corrosion inhibitors, friction reducers, gelling agents, iron control agents, pH adjusting agents, scale inhibitors, and surfactants. Historically, diesel has at times been used as a substitute for water in cold environments, or where a formation to be fractured is water sensitive, such as, for example, clay. The use of diesel, however, has been phased out over time because of price, and the development of newer, better technologies.

In FIG. 1, there are specifically shown sand transporting vehicles 26, an acid transporting vehicle 28, vehicles for transporting other chemicals 30, and a vehicle carrying a hydration unit 32, such as, for example, a water pump. Also shown are fracturing fluid blenders 34, which can be configured to mix and blend the components of the hydraulic fracturing fluid, and to supply the hydraulic fracturing fluid to the pumps 10. In the case of liquid components, such as water, acids, and at least some chemicals, the components can be supplied to the blenders 34 via fluid lines (not shown) from the respective component vehicles, or from the hydration unit 32. In the case of solid components, such as sand, the component can be delivered to the blender 34 by a conveyor belt 38. The water can be supplied to the hydraulic unit 32 from, for example, water tanks 36 onsite. Alternately, the water can be provided by water trucks. Furthermore, water can be provided directly from the water tanks 36 or water trucks to the blender 34, without first passing through the hydration unit 32.

Pump control and data monitoring equipment 40 can be mounted on a control vehicle 42, and connected to the pumps 10, electric motors 14, blenders 34, and other downhole sensors and tools (not shown) to provide information to an operator, and to allow the operator to control different parameters of the fracturing operation. For example, the pump control and data monitoring equipment 40 can include an A/C console that controls the VFD, and thus the speed of the electric motor 14 and the pump 10. Other pump control and data monitoring equipment can include pump throttles, a pump VFD fault indicator with a reset, a general fault indicator with a reset, a main estop, a programmable logic controller for local control, and a graphics panel. The graphics panel can include, for example, a touchscreen interface.

Figure 2:
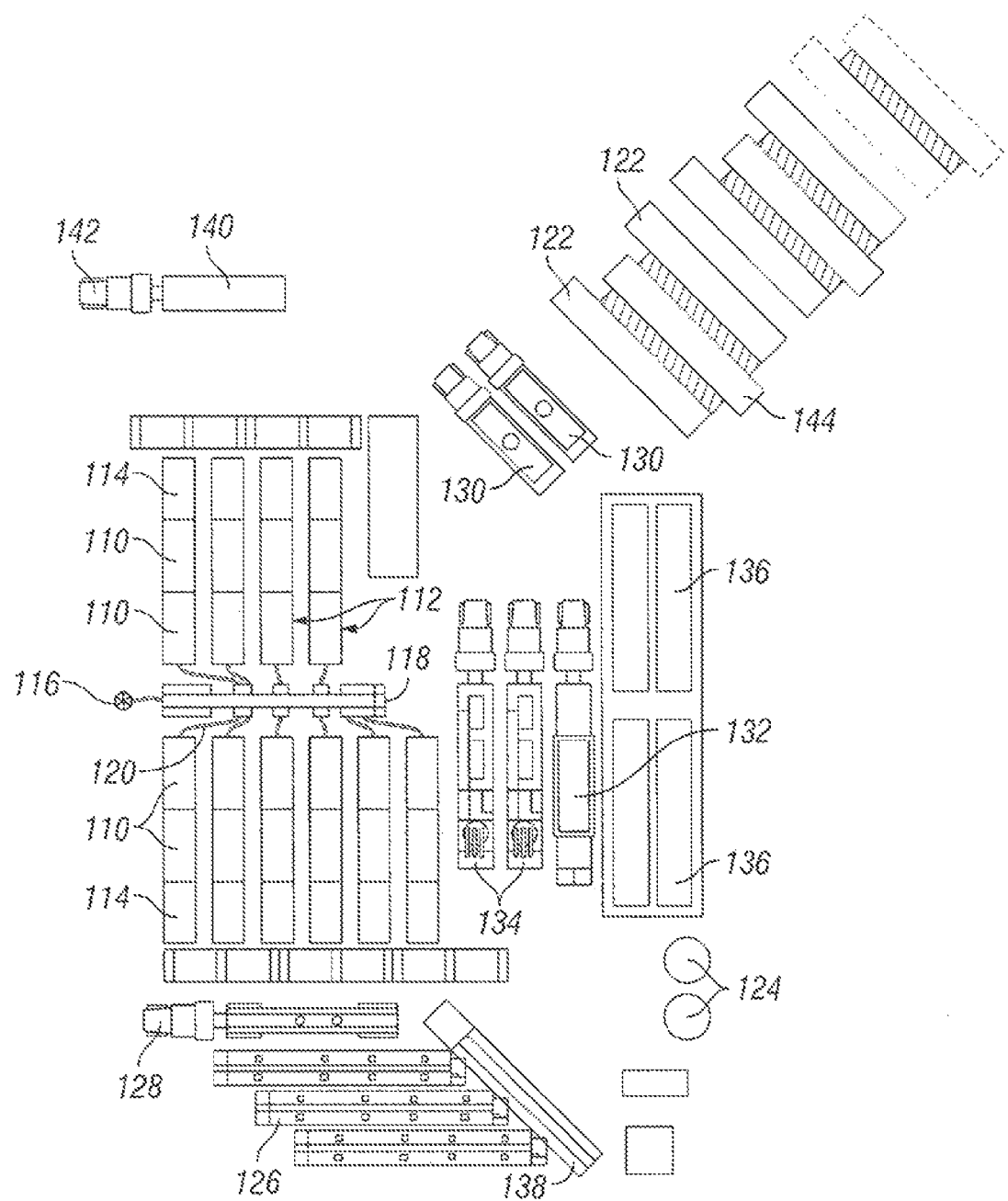
FIG. 2 is a schematic plan view of equipment used in a hydraulic fracturing operation, according to an alternate embodiment of the present technology.

Referring now to FIG. 2, there is shown an alternate embodiment of the present technology. Specifically, there is shown a plurality of pumps 110 which, in this embodiment, are mounted to pump trailers 112. As shown, the pumps 110 can optionally be loaded two to a trailer 112, thereby minimizing the number of trailers needed to place the requisite number of pumps at a site. The ability to load two pumps 110 on one trailer 112 is possible because of the relatively light weight of the electric pumps 110 compared to other known pumps, such as diesel pumps. In the embodiment shown, the pumps 110 are powered by electric motors 114, which can also be mounted to the pump trailers 112. Furthermore, each electric motor 114 can be equipped with a VFD, and an A/C console, that controls the speed of the motor 114, and hence the speed of the pumps 110.

In addition to the above, the embodiment of FIG. 2 can include a skid (not shown) for supporting some or all of the above-described equipment. For example, the skid can support the electric motors 114 and the pumps 110. In addition, the skid can support the VFD. Structurally, the skid can be constructed of heavy-duty longitudinal beams and cross-members made of an appropriate material, such as, for example, steel. The skid can further include heavy-duty lifting lugs, or eyes, that can optionally be of sufficient strength to allow the skid to be lifted at a single lift point.

The pumps 110 are fluidly connected to a wellhead 116 via a missile 118. As shown, the pump trailers 112 can be positioned near enough to the missile 118 to connect fracturing fluid lines 120 between the pumps 110 and the missile 118. The missile 118 is then connected to the wellhead 116 and configured to deliver fracturing fluid provided by the pumps 110 to the wellhead 116.

Still referring to FIG. 2, this embodiment also includes a plurality of turbine generators 122 that are connected to, and provide power to, the electric motors 114 on the pump trailers 112. To accomplish this, the turbine generators 122 can be connected to the electric motors 114 by power lines (not shown). The turbine generators 122 can be connected to the electric motors 114 via power distribution panels (not shown). In certain embodiments, the turbine generators 122 can be powered by natural gas, similar to the electric generators 22 discussed above in reference to the embodiment of FIG. 1. Also included are control units 144 for the turbine generators 122.

The embodiment of FIG. 2 can include other equipment similar to that discussed above. For example, FIG. 2 shows sand transporting vehicles 126, acid transporting vehicles 128, other chemical transporting vehicles 130, hydration units 132, blenders 134, water tanks 136, conveyor belts 138, and pump control and data monitoring equipment 140 mounted on a control vehicle 142. The function and specifications of each of these is similar to corresponding elements shown in FIG. 1.

Use of pumps 10, 110 powered by electric motors 14, 114 and natural gas powered electric generators 22 (or turbine generators 122) to pump fracturing fluid into a well is advantageous over known systems for many different reasons. For example, the equipment pumps, electric motors, and generators) is lighter than the diesel pumps commonly used in the industry. The lighter weight of the equipment allows loading of the equipment directly onto a truck body. In fact, where the equipment is attached to a skid, as described above, the skid itself can be lifted on the truck body, along with all the equipment attached to the skid, in one simple action. Alternatively, and as shown in FIG. 2, trailers 112 can be used to transport the pumps 110 and electric motors 114, with two or more pumps 110 carried on a single trailer 112. Thus, the same number of pumps 110 can be transported on fewer trailers 112. Known diesel pumps, in contrast, cannot be transported directly on a truck body or two on a trailer, but must be transported individually on trailers because of the great weight of the pumps.

The ability to transfer the equipment of the present technology directly on a truck body or two to a trailer increases efficiency and lowers cost. In addition, by eliminating or reducing the number of trailers to carry the equipment, the equipment can be delivered to sites having a restricted amount of space, and can be carried to and away from worksites with less damage to the surrounding environment. Another reason that the electric pump system of the present technology is advantageous is that it runs on natural gas. Thus, the fuel is lower cost, the components of the system require less maintenance, and emissions are lower, so that potentially negative impacts on the environment are reduced.

In practice, a hydraulic fracturing operation cart be carried out according to the following process. First, the water, sand, and other components are blended to form a fracturing fluid, which is pumped down the well by the electric-powered pumps. Typically, the well is designed so that the fracturing fluid can exit the wellbore at a desired location and pass into the surrounding formation. For example, in some embodiments the wellbore can have perforations that allow the fluid to pass from the wellbore into the formation. In other embodiments, the wellbore can include an openable sleeve, or the well can be open hole. The fracturing fluid can be pumped into the wellbore at a high enough pressure that the fracturing fluid cracks the formation, and enters into the cracks. Once inside the cracks, the sand, or other proppants in the mixture, wedges in the cracks, and holds the cracks open.

Using the pump control and data monitoring equipment 40, the operator can monitor, gauge, and manipulate parameters of the operation, such as pressures, and volumes of fluids and proppants entering and exiting the well. For example, the operator can increase or decrease the ratio of sand to water as the fracturing process progresses and circumstances change.

This process of injecting fracturing fluid into the wellbore can be carried out continuously, or repeated multiple times in stages, until the fracturing of the formation is optimized.

Optionally, the wellbore can be temporarily plugged between each stage to maintain pressure, and increase fracturing in the formation. Generally, the proppant is inserted into the cracks formed in the formation by the fracturing, and left in place in the formation to prop open the cracks and allow oil or gas to flow into the wellbore.

While the technology has been shown or described in only some of its forms, it should be apparent to those skilled in the art that it is not so limited, but is susceptible to various changes without departing from the scope of the technology. Furthermore, it is to be understood that the above disclosed embodiments are merely illustrative of the principles and applications of the present technology. Accordingly, numerous modifications can be made to the illustrative embodiments and other arrangements can be devised without departing from the spirit and scope of the present technology as defined by the appended claims.

What is claimed is:

1. A system for hydraulically fracturing an underground formation in an oil or gas well to extract oil or gas from the formation, the oil or gas well having a wellbore that permits passage of fluid from the wellbore into the formation, the system comprising:
    a plurality of electric pumps fluidly connected to the well and powered by at least one electric motor, and configured to pump fluid into the wellbore at high pressure so that the fluid passes from the wellbore into the formation, and fractures the formation; and
    a variable frequency drive connected to the electric motor to control the speed of the motor, wherein the variable frequency drive frequently performs electric motor diagnostics to prevent damage to the at least one electric motor.

2. The system of claim 1, further comprising:
    an AIC console and a variable frequency drive that controls the speed of the pumps.

3. The system of claim 1, wherein the electric pumps are mounted on vehicles, and can be ported from one well to another.

4. The system of claim 1, further comprising:
    a plurality of generators electrically connected to the plurality of electric pumps to provide electrical power to the pumps.

5. The system of claim 4, wherein at least some of the plurality of generators are powered by natural gas.

6. The system of claim 4, wherein at least some of the plurality of generators are turbine generators.

7. The system of claim 4, wherein the electric pumps and generators are mounted on vehicles, and can be ported from one well to another.

8. The system of claim 4, wherein the vehicles are trucks having at least five axles.

9. The system of claim 1, wherein the variable frequency drive has one or more power semiconductor heat sinks having thermal sensors monitored by a microprocessor to prevent damage caused by excessive heat.

10. A system for fracturing a rock formation in an oil or gas well by pumping hydraulic fracturing fluid into the well, the system comprising:
    a pump for pumping the hydraulic fracturing fluid into the well, and then from the well into the formation., the pump capable of pumping the hydraulic fracturing fluid at high pressure to crack the formation;
    an electric motor having a high-strength steel or steel alloy shaft attached to the pump and configured to drive the pump; and
    a variable frequency drive connected to the electric motor to control the speed of the motor, Wherein the variable frequency drive frequently performs electric motor diagnostics to prevent damage to the electric motor.

11. The system of claim 10, wherein the pump is a triplex or a quinteplex pump rated at about 2250 hydraulic horsepower or more.

12. The system of claim 11, wherein the pump has 4.5 inch diameter plungers with an eight inch stroke.

13. The system of claim 10, wherein the electric motor has a maximum continuous power output of about 1750 brake horsepower or more.

14. The system of claim 13, wherein the electric motor has a. .maximum continuous torque of about 8750 lb-ft or more.

15. The system of 14, wherein the electric motor has a high temperature rating of about 400 degrees C. or more.

16. The system of 15, wherein the shaft e electric motor is composed of 4340 alloy steel.

17. The system of claim 10, further comprising:
    a natural gas powered generator connected to the electric motor that provides electric power to the electric motor.

18. The system of claim 17, wherein the natural gas powered generator is a turbine generator.

19. A system for hydraulically fracturing an underground formation in an oil or gas well to extract oil or gas from the formation, the oil or gas well having a wellbore that permits passage of fluid from the wellbore into the formation, the system comprising:
    a trailer for attachment to a truck;
    two or more electric pumps attached to the trailer and fluidly connected to the well, the electric pumps configured to pump fluid into the wellbore at high pressure so that the fluid passes from the wellbore into the formation, and fractures the formation;
    one or more electric motors attached to the electric pumps to drive the pumps, the electric motors attached to the trailer; and
    a variable frequency drive connected to the electric motor to control the speed of the motor, wherein the variable frequency drive frequently performs electric motor diagnostics to prevent damage to the one or more electric motors.

20. The system of claim 19, further comprising:
    a skid to which at least one of the electric pumps, the one or more electric motors, and the variable frequency drives are attached.

21. The system of claim 19, further comprising:
    a natural gas powered generator for connection to the electric motor that provides electric power to the electric motor.

* * * * *